F. & A. POOLE.
TIMBER HOOK.
APPLICATION FILED SEPT. 20, 1912.
1,070,526.
Patented Aug. 19, 1913.
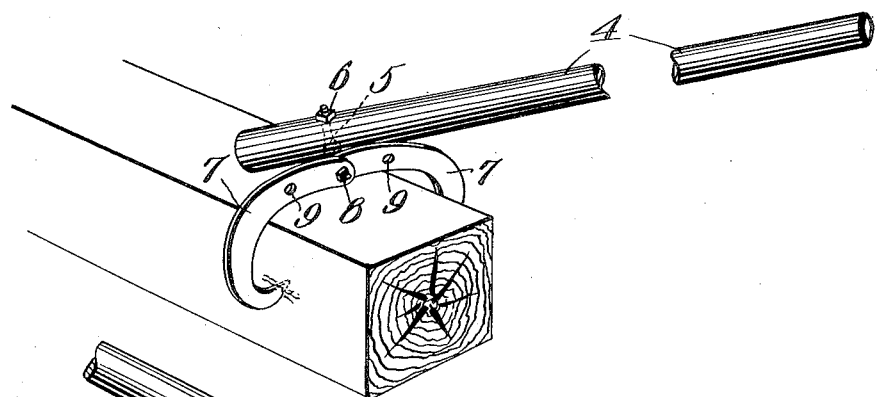
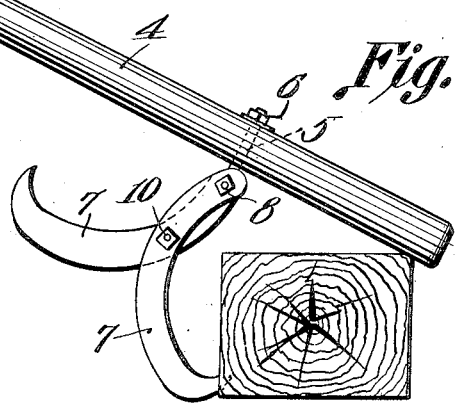
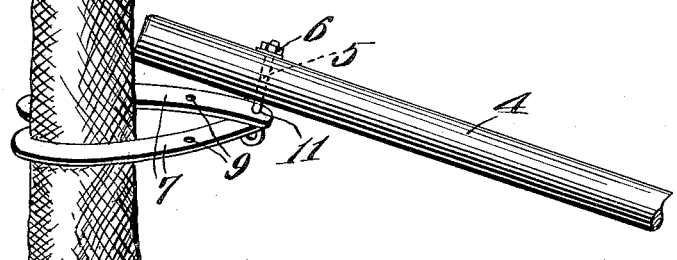
F. Poole and A. Poole.
Inventors,
by C. A. Snow & Co.
Attorneys

UNITED STATES PATENT OFFICE.

FRANCIS POOLE AND ARTHUR POOLE, OF ALDEN STATION, PENNSYLVANIA.

TIMBER-HOOK.

1,070,526.

Specification of Letters Patent.

Patented Aug. 19, 1913.

Application filed September 20, 1912. Serial No. 721,483.

*To all whom it may concern:*

Be it known that we, FRANCIS POOLE and ARTHUR POOLE, citizens of the United States, residing at Alden Station, in the county of Luzerne, State of Pennsylvania, have invented a new and useful Timber-Hook, of which the following is a specification.

The present invention appertains to a timber hook, and aims to provide an implement which will be useful in carrying or lifting timber and other cumbersome objects and in rolling the same, and which may also be employed for felling trees, pulling out fence posts and the like.

To the said ends, the present invention resides in an implement of novel and improved construction, as will hereinafter appear and as claimed, it being understood that changes in the precise embodiment of the invention herein disclosed, can be made within the scope of what is claimed, without departing from the spirit of the invention.

The invention has been illustrated in its preferred embodiment in the accompanying drawings, wherein—

Figure 1 is a perspective view thereof as in use, part of the handle being broken away, the implement being employed for lifting a timber. Fig. 2 is a side elevation of the device as employed in rolling a piece of timber. Fig. 3 is a perspective view of the device as employed in felling a tree.

Referring specifically to the drawings, the present implement embodies a suitable handle 4 and an eye bolt 5, the shank of which is journaled through the handle adjacent its outer end, a nut 6 being screw threaded on the tail end of the bolt to retain the same in pivotal relation with the handle.

A pair of hooks 7 have their butt ends overlapped and fulcrumed or pivoted to the eye bolt 5, so as to swing in parallel planes, a bolt 8 being passed through the eye of the bolt 5 and on which the said hooks are fulcrumed. These hooks are each provided with an aperture 9 adjacent its fulcrum, the two apertures being adapted to register when the hooks are overlapped, as indicated in Fig. 2. A bolt 10 is then adapted to be passed through the apertures 9 to retain the hooks in such position, the tips or ends of the hooks projecting in opposite directions away from each other.

When the implement is to be employed for lifting or carrying a piece of timber or other object, the hooks 7 are swung apart so as to straddle the object and engage the sides thereof, the outer end of the handle being brought against the object, as seen in Fig. 1, so that a person may grasp the other end of the handle. Thus, by engaging the timber at each end with one of the implements, two or more laborers may readily lift or carry the timber, either on a level or on an incline in a ready and convenient manner. When the device is to be employed for rolling timbers, the hooks 7 are made to overlap and the bolt 10 is passed through the apertures 9, in which event, either of the hooks may be employed for rolling the timber in the ordinary fashion, which is well understood in the art, as illustrated in Fig. 2. When the device is to be employed for felling trees, the bolt 8 is removed and the bolt 5 is withdrawn and is then passed through the apertures 11 at the butt ends of the hooks, so that the hooks are fulcrumed to the shank of the bolt 5 adjacent the eye thereof. The bolt 5 is then again attached to the handle and the hooks 7 may be swung into engagement with the tree, the outer end of the handle being brought against the near side of the tree directly above the hooks, as illustrated in Fig. 3, so that by swinging the free end of the handle upward, sufficient force may be applied to the tree to fell same as will be apparent. By attaching a pair of the implements to a fence post on the opposite sides thereof, as illustrated in Fig. 3, the post may be lifted or drawn out of engagement with the soil. This implement will therefore be useful in connection with carrying, rolling and lifting timbers in mines, or for handling telephone and telegraph poles, or other cumbersome objects, the device also being adapted for felling trees and for extracting fence posts.

From the foregoing, taken in connection with the drawings, the advantages and capabilities of the present invention will be manifest, and it will also be apparent that the object aimed at has been attained in a satisfactory manner, the present device providing a desirable one for the purposes for which it is designed.

Having thus described the invention what is claimed as new is:

1. In an implement of the character described, a handle, a member swiveled thereto, a pair of hooks pivoted to the said member, so that the hooks may straddle and engage the sides of a timber with the outer end of the handle bearing against the timber for carrying the same, and means for locking the hooks together so that the tips project away from each other, and so that the respective hooks and handle may be employed for rolling timber.

2. In an implement of the character described, a handle, an eye bolt having its shank removably swiveled to the handle, a removable pivot passing through the eye of the said bolt, a pair of hooks removably pivoted to the said pivot, so that the hooks may straddle and engage the sides of a timber with the outer end of the handle bearing against the timber for carrying the same, and means for locking the hooks together so that the tips project away from each other and so that the respective hooks and handle may be employed for rolling timber, the pivot being detachable from the eye bolt and the eye bolt being detachable from the handle, so that the hooks may be pivoted to the shank of the bolt for felling trees.

In testimony that we claim the foregoing as our own, we have hereto affixed our signatures in the presence of two witnesses.

FRANCIS POOLE.
ARTHUR POOLE.

Witnesses:
ELIAS BELLEO,
EVANDER P. KROMAS.

---

Copies of this patent may be obtained for five cents each, by addressing the "Commissioner of Patents, Washington, D. C."